UNITED STATES PATENT OFFICE.

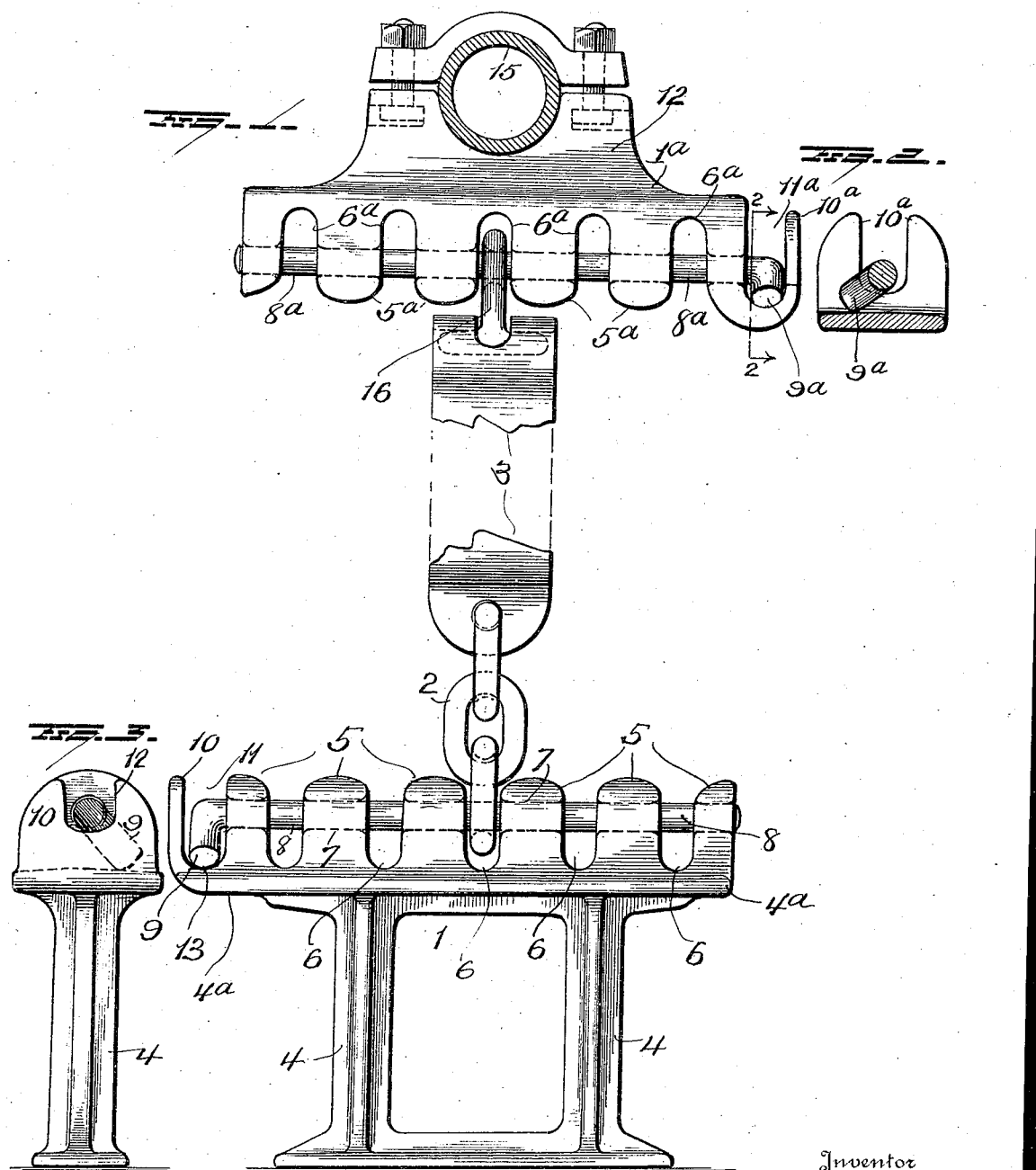

HUGO C. RASSMANN, OF BEAVER DAM, WISCONSIN, ASSIGNOR TO F. RASSMANN MFG. CO., OF BEAVER DAM, WISCONSIN.

ALIGNING MEANS FOR STANCHIONS.

1,415,117. Specification of Letters Patent. Patented May 9, 1922.

Application filed January 14, 1922. Serial No. 529,256.

*To all whom it may concern:*

Be it known that I, HUGO C. RASSMANN, a citizen of the United States, and a resident of Beaver Dam, in the county of Dodge and State of Wisconsin, have invented certain new and useful Improvements in Aligning Means for Stanchions; and I do hereby declare the following to be a full, clear, and exact description of the invention, such as will enable others skilled in the art to which it appertains to make and use the same.

This invention relates to improvements in aligning means for stanchions,—one object of the invention being to provide simple and easy means whereby the stanchion may be readily adjusted forwardly or backwardly to properly align the animal with the stall gutter, and effectually hold said stanchion in adjusted position.

A further object is to so construct a device for the purpose stated, that the use of nuts, cotter keys or similar holding means to hold the chain at the bottom of the stanchion or the swivel at the top of the stanchion shall be obviated.

With these and other objects in view, the invention consists in certain novel features of construction and combinations of parts as hereinafter set forth and pointed out in the claims.

In the accompanying drawings; Figure 1 is a view in elevation illustrating my improvements; Figure 2 is a sectional view on the line 2—2 of Figure 1, and Figure 3 is an end view of the bottom bracket.

In the drawings, I have showed at 1, a bottom bracket to be suitably mounted on the curb of a stall, and with which a link of a chain 2 depending from a stanchion 3, is adjustably connected.

The bracket 1 includes a base portion 4, at the top of which, an integral, horizontally disposed plate $4^a$ is located and provided with a plurality of spaced upstanding arms or projections 5 arranged in alignment with each other and forming a series of open slots or recesses 6. The arms or projections 5 are made with horizontal, aligning holes 7 for the passage of a connecting pin 8, the latter having a laterally projecting arm 9 at one end. The plate $4^a$ of bracket 1 is provided at one end with an upwardly projecting arm 10 forming an open slot or recess 11 between the same and the adjacent perforated arm or projection 5 and said arm 10 is made with an open notch 12 in alignment with the aligning holes 7 in the arms or projections 5.

It is apparent that when the connecting pin is turned so that its arm 9 will be in an upright position in line with the notch 12 of the arm 10, said pin can be withdrawn to release the stanchion chain 2. The bottom portion of the stanchion may then be adjusted lengthwise of the stall and the bottom link of the chain inserted into another notch or slot 6 and the connecting pin 8 replaced. The lower portion of the stanchion will then be effectually connected with the bracket 1 and possibility of displacement will be prevented. When the stanchion chain is thus connected with the bracket, the arm 9 at one end of the connecting pin 8 will drop in the recess 11 and rest upon the bottom 13 of the latter, said bottom being below the plane of the aligning holes 6 and notch 7. In this manner, accidental displacement of the connecting pin will be prevented and the stanchion chain may thus be locked to the bracket in any desired position of adjustment.

If desired, a supporting and aligning bracket $1^a$ for the upper end of the stanchion, having the same novel features of construction as the lower bracket, may be employed. The upper bracket is formed with an enlargement 14 clamped to a stall bar 15, with the bracket in inverted position as compared to the bracket 1. The bracket $1^a$ is provided with spaced depending arms or projections $5^a$ forming slots or recesses $6^a$, and the arms or projections $5^a$ are perforated for the passage of the connecting pin $8^a$,—the latter having an arm $9^a$ to be disposed in the open notch or recess $11^a$ formed by the notched arm $10^a$. In the construction of the upper aligning bracket, the arm $10^a$ projects from one of the end arms or projections $5^a$ of the bracket. For connecting the upper end of the stanchion 3 with the upper bracket, a swivel 16 or other suitable connecting device may be employed.

Having fully described my invention what I claim as new and desire to secure by Letters-Patent, is:—

1. An aligning device for a stanchion, comprising a part provided with an aligning series of spaced members forming recesses and having aligning holes, a connecting pin movable through said holes, an arm on one end of said connecting pin, and means receiving said arm whereby accidental displacement of the connecting pin will be prevented.

2. An aligning device for a stanchion, comprising bracket provided with a series of spaced arms forming recesses between them and having aligning perforations, said bracket also having a notched arm at one end and spaced from the adjacent perforated arm, a connecting pin movable through the perforated arms and having an arm projecting laterally from one end of the same, said arm on the pin being movable through the notch of the notched arm on the bracket and adapted normally to rest in the space formed by said notched arm to lock the pin against accidental displacement.

3. In aligning means for a stanchion, a bottom bracket comprising a base portion, a horizontal plate integral with the same, said plate having a row of upstanding spaced arms or projections having aligning horizontal perforations, a notched arm at one end of said plate and spaced from the adjacent perforated arm, and a connecting pin movable through perforated arms and having a lateral arm at one end to rest between said notched arm and the adjacent perforated arm.

In testimony whereof, I have signed this specification in the presence of two subscribing witnesses.

HUGO C. RASSMANN.

Witnesses:
A. B. CHANDLER,
E. J. LAWRENCE.